United States Patent [19]

Nicksic

[11] 4,446,118

[45] May 1, 1984

[54] SCRUBBING HYDROGEN SULFIDE FROM A FUEL GAS

[75] Inventor: Stephen W. Nicksic, Brea, Calif.

[73] Assignee: Chevron Research Company, San Francisco, Calif.

[21] Appl. No.: 382,460

[22] Filed: May 27, 1982

[51] Int. Cl.³ .................... B01D 53/34; C01B 17/04
[52] U.S. Cl. .................. 423/226; 423/228; 423/573 G
[58] Field of Search ............ 423/224, 226, 278, 229, 423/232, 573 R, 573 G; 568/27, 38

[56] References Cited

U.S. PATENT DOCUMENTS

| | | | |
|---|---|---|---|
| 2,581,050 | 1/1952 | Smedslund | 568/27 |
| 3,045,051 | 7/1962 | Coma et al. | 568/27 |
| 3,428,671 | 2/1969 | Toland | 568/38 |
| 3,622,273 | 11/1971 | Roberts et al. | 423/226 |
| 3,793,440 | 2/1974 | Schulze | 423/573 |
| 4,240,922 | 12/1980 | Sartori et al. | 423/226 X |

FOREIGN PATENT DOCUMENTS

| | | | |
|---|---|---|---|
| 1430889 | 1/1966 | France | 423/226 |
| 50-18382 | 2/1975 | Japan | 423/573 R |

OTHER PUBLICATIONS

Mehmet et al., "The Reaction of Hydrogen Sulfide with Sulfoxides", Phosphorus and Sulfur, vol. 1, pp. 47–54, 1976.

Primary Examiner—Earl C. Thomas
Attorney, Agent, or Firm—D. A. Newell; S. R. La Paglia; C. L. Hartman

[57] ABSTRACT

A method of removing hydrogen sulfide contaminants from a gas stream. The gas stream is contacted with dimethyl sulfoxide promoted with the salt of an organic acid, reducing $H_2S$ to sulfur.

3 Claims, No Drawings

SCRUBBING HYDROGEN SULFIDE FROM A FUEL GAS

BACKGROUND OF THE INVENTION

The present invention relates to an improved method for removing hydrogen sulfide from gases. More specifically, the present invention relates to a method for removing hydrogen sulfide from fuel gases by scrubbing with organic solvents.

Produced fuel gases such as natural gas and petroleum like gas fractions often contain substantial concentrations of hydrogen sulfide. Normally, hydrogen sulfide must be removed before the produced gas is suitable for sale or distribution through pipelines, in order to meet the product specifications required by commercial gas suppliers. It is also desirable to remove hydrogen sulfide from fuel gases before they are burned to reduce sulfur oxides emissions. In addition to produced fuel gases, other gases such as petroleum refinery offgas streams, are often contaminated with hydrogen sulfide. The presence of hydrogen sulfide can be detrimental and such gases are used in hydrocarbon or petrochemical processing. The presence of hydrogen sulfide also complicates the disposal of refinery gases by, for example, flaring, since sulfur dioxide produced during burning poses an emissions problem.

Various techniques have been suggested for removing hydrogen sulfide from fuel and other gases.

Among the methods proposed for removal of hydrogen sulfide from gases has been the use of solid, dry material such as zeolites or iron sponge. The use and regeneration of zeolites is often impractical for processing large quantities of relatively inexpensive natural gas. Another technique for removing hydrogen sulfide from gases has been scrubbing gases with aqueous or other liquid solutions. Generally, liquid materials such as aqueous solutions of amine, alkanolamines, potassium carbonate and the like, which have been used to remove hydrogen sulfide from gases by liquid phase scrubbing also removes substantial amounts of carbon dioxide and keep the gas streams saturated in water vapor. As aqueous and other liquid scrubbing processes usually operate by forming a chemical addition produce of hydrogen sulfide and, for example, an amine in liquid solution and then stripping the hydrogen sulfide out of the liquid solution in concentrated form. Disposal of this concentrated hydrogen sulfide usually requires a Claus unit or the like for converting hydrogen sulfide to sulfur.

Other methods of removing hydrogen sulfide from gases include contacting the gases with iron oxide. Iron oxide has been used in the form of pellets, powder and the like and has been used on essentially inert solids supports such as wood shavings, clays and the like. One problem with solid beds such as iron oxides sponges is that removal of the spent iron oxide sponge tends to be difficult. The hyrogen sulfide tends to bind the mass into a cohesive solid unit resistant to convenient removal means such as water spraying.

Another component frequently present in fuel gases is water. It is desirable to remove water from fuel gases since water vapor in gas streams can cause condensation and corrosion problems in pipelines. Conventionally, water is removed from a wet gas in a separate step by contacting the gas with a hydroscopic liquid, for example, diethylene glycol.

SUMMARY OF THE INVENTION

The present invention provides a method for removing hydrogen sulfide from a fuel gas comprising contacting said fuel gas with a liquid solution of a hydrogen sulfide scrubber having a general formula of:

where $R^1$ and $R^2$ are substituents having between 1 and 12 carbon atoms. A preferred hydrogen sulfide scrubber is dimethyl sulfoxide, hereinafter DMSO. In a preferred embodiment the reduced sulfide species produced from the corresponding sulfoxide is reoxidized and recirculated to scrub more fuel gas.

DETAILED DESCRIPTION OF THE INVENTION

Gases which can suitably be treated for removal of hydrogen sulfide include, for example, methane, ethane, propane, isopropane, n-butane, isobutane and like paraffins, ethene, propylene, and like olefins, carbon dioxide, molecular nitrogen, molecular oxygen, molecular hydrogen and the like. The term fuel gas as used herein defines any gas that is substantially hydrocarbonaceous of whatever origin. This includes natural gas, offgas, produced gas and the like. The method of this invention is particularly adapted for removing hydrogen sulfide from natural gas and like gas fractions of petroleum which typically contain a major proportion of methane along with a mixture of low molecular weight paraffins and olefins. Hydrocarbon gas streams may also contain substantial quantities of water vapor. For various reasons air often becomes mixed with produced hydrocarbon gases such as natural gas during the gathering and transmission. A mixture of natural gas and air can suitably be treated according to the present invention. Preferably mixtures of gaseous hydrocarbons with carbon dioxide, nitrogen, oxygen, water vapor, hydrogen and the like are subjected to hydrogen sulfide and water removal. According to the present invention, the fuel gas stream is contacted with a liquid hydrogen sulfide scrubber containing at least 10 volume percent of a scrubbing agent having a general formula of:

where $R^1$ and $R^2$ are substituents having between 1 and 12 carbon atoms. A particularly preferred scrubber is DMSO. The scrubber can be either pure or it can be a solution containing by-products from the reaction, primarily water as well as water removed from the gas. The scrubber can be dissolved in an organic solvent if desired. It is preferred that the scrubber be promoted with a promoter. Preferred promoters include salts of weak acids, of the form MX, where M is a metal selected from the alkaline or alkaline earth metals or a primary, secondary or tertiary amine and X is an anion from a weak acid, preferably formate, acetate, oxalate, propionate and butyrate. The promoter can include primary, secondary or tertiary amines selected from a group consisting of amines of the form $NR_1R_2R_3$ where $R_1$, $R_2$ and $R_3$ are substituents having between 1 and 10 carbon atoms or hydrogen. The promoter can also include an organic acid having between 1 and 12 carbon atoms added to the amine. Preferred amines include diethanol amine and triethanol amine. Preferred organic acids include acetic, formic, oxalic, proprionic and butyric. It will be appreciated by one skilled in the art that in DMSO solution the actual species present is the salt of the amine and organic acid chosen. Examples include sodium acetate, triethanol ammonium acetate, calcium acetate, sodium carbonate, triethanol ammonium carbonate and the like. If an amine is used it is preferred that it be an amine with a low enough vapor pressure that it not be swept from the reaction vessel by the flow of fuel gas. It is possible to form the desired ammonium salt in situ by adding, for example, triethanol amine and acetic acid to DMSO.

The reaction that seems to take place is

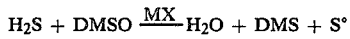

where dimethylsulfide is, herein, referred to as DMS. Sulfur is observed to precipitate from this reaction in large crystals of nearly pure sulfur when the reaction medium is substantially DMSO. The crystals of sulfur formed from this reaction tend to be large crystals that can be easily separated by physical techniques. The size of sulfur crystals seems to be determined by the solubility of $H_2S$ in the reaction medium. More water tends to lower $H_2S$ solubility giving smaller sulfur crystals.

While not wishing to be bound by any particular theory of operation, it is believed that the amine acts to promote the formation of polysulfides. It is also believed that the polysulfides in the presence of promoters, such as sodium acetate then form sulfur crystals.

It is well known that DMSO is hydroscopic. Therefore, if the fuel gas contains water, the water will tend to be removed and remain in the DMSO solution thereby dehydrating the fuel gas stream. This is advantageous since fuel gases must be typically dehydrated in a separate step as well as having the hydrogen sulfide removed.

In one preferred mode of operation a feed gas containing hydrogen sulfide is contacted with a liquid scrubber containing at least 10 volume percent of a scrubbing agent, for example, DMSO, in a contact zone. The feed gas is scrubbed and the reduced form of the scrubbing agent, DMS, is formed. DMS has different physical properties than DMSO, for example, DMS boils at about 38° C. and DMSO boils at about 189° C., and can be physically separated. The DMS can then be reoxidized by the process of U.S. Pat. No. 2,581,050 or 3,045,051 and recirculated back to the contact zone.

The present invention works well with other sulfoxides other than DMSO, for example, ethylmethyl sulfoxide, or diethyl sulfoxide and the like. The choice of sulfoxide depends upon the relative physical properties of the sulfoxide and the produced sulfide versus the amount of the scrubbing needed in the particular system. Dimethyl sulfoxide has more oxygen per weight of compound than diethyl sulfoxide, but, in certain applications diethyl sulfoxide may have much more desirable physical properties, for example, its boiling point is 92° C. In the practice of the present invention sulfoxides of the general formula of:

where $R^1$ and $R^2$ are substituents with between 1 and 12 carbons can be used.

If other sulfoxides than DMSO are used the resulting sulfide will be different. In particular the sulfide will have a general formula of $R^1SR^2$ where $R^1$ and $R^2$ are substituents having between 1 and 12 carbon atoms.

It has been observed that the reaction starts more quickly if there is some amount of elemental sulfur present in the reaction vessel. If there is not an amount of elemental sulfur present in the reaction vessel, reaction starts very slowly until it builds up some amount of elemental sulfur and then speeds up.

Neither molecular oxygen nor carbon dioxide in the fuel gas interferes with the reaction of hydrogen sulfide with sulfoxides in the presence of nonvolatile promoters. Therefore, air need not be excluded from the reaction.

EXAMPLE

This example shows the ability of DMSO to both dehydrate sour gas and sweeten sour gas.

An apparatus was set up where gas is bubbled through a first 40 ml reaction vessel containing 20 ml DMSO and then bubbled through a second 40 ml reaction vessel containing 20 ml DMSO, 0.3 g elemental sulfur, 0.5 ml acetic acid and 0.3 g diethanol amine and then into a third vessel immersed in a dry ice-acetone bath, which serves as a cold trap.

A gas flow rate of 150 ml per minute of a reaction gas containing 200 to 2000 parts per million hydrogen sulfide in nitrogen at room temperature was maintained. A nitrogen carrier gas containing 10% carbon dioxide was used and oxygen was excluded in order to eliminate direct oxidation of $H_2S$ as a factor in the sweetening reaction. The separate hydrator was used so that water resulting from the chemical reactions could be separately determined from the water of dehydration.

The reaction vessels' contents were all measured by NMR to determine the amount of water and reaction products in each vessel. DMS was dissolved in cold tetrachloroethylene in the cold trap and analyzed by NMR. The dehydrator removed all the water in the initial gas stream. After a few minutes to saturate the dehydrator, the concentration of $H_2S$ leaving the first reaction vessel was the same as the inlet concentration, indicating that no detectable reaction of hydrogen sulfide with DMSO under these conditions. When simple amines, with low vapor pressures, were used as the promoter, they could be easily swept out of the reactor and recovered in the cold trap in spite of the high concentration of carbon dioxide in the gas. Therefore, diethanol amine, hereinafter DEA, which is not as easily swept out of the reactor, was used as the promoter, and its concentration remained reasonably constant indicating no significant reactions involving DEA other than the catalytic promotion reaction.

During the reaction, it was observed that a deep red color, characteristic of polysulfides, developed in the second reaction vessel. After roughly an equivalent of hydrogen sulfide was removed from the gas, the sweetening of the gas was not as good. At this point, an NMR spectrum analysis of the cold trap contents showed nothing but traces of DMSO. Therefore, the conclusion was drawn that very effective sweetening occurs when polysulfide formation happens.

Sulfur was not needed in the second reaction vessel except that initiation of sweetening was much faster if a small amount of sulfur is present. The reactor would not handle high hydrogen sulfide concentrations at the indicated flow rate, but the removal of hydrogen sulfide at about 2000 ppm continued for an indefinite period of time. Water content increased in the reactor, and some found its way into the cold trap. NMR data on the cold trap shows a large peak identified as DMS in an amount about proportional to the amount of H₂S removed. There was no evidence of any side reactions. The precipitation of sulfur could be carried out by replacing diethanol amine with sodium, potassium, magnesium, calcium or lithium acetate. In every case added sulfur was beneficial in initiating the reaction, suggesting that a polysulfide intermediate is involved in the oxidation of hydrogen sulfide. Glycolic acid was better than acetic acid as a promoter, perhaps because glycolates are more soluble in DMSO than acetates.

What is claimed is:

1. A method of removing hydrogen sulfide from fuel gas comprising:
    contacting said fuel gas with an aqueous scrubber solution having at least 10 volume percent of a hydrogen sulfide scrubbing agent of the formula:

wherein $R^1$ and $R^2$ are substituents having between 1 and 12 carbon atoms; and wherein said aqueous scrubber solution contains less than about 1 weight percent of a promoter comprising added organic acids having between 1 and 12 carbon atoms.

2. The method of claim 1 wherein said promoter is a salt selected from the group consisting of salts of the form MX where M is the cation of a primary, secondary or tertiary amine, alkali metal, or alkaline earth metal and X is the anion of said organic acid having between 1 and 12 carbon atoms.

3. The method of claim 2 wherein X is the anion of formic acid, acetic acid, oxalic acid, propionic acid or butyric acid.

* * * * *

UNITED STATES PATENT AND TRADEMARK OFFICE
CERTIFICATE OF CORRECTION

PATENT NO. : 4,446,118
DATED : May 1, 1984
INVENTOR(S) : Stephen W. Nicksic

It is certified that error appears in the above-identified patent and that said Letters Patent are hereby corrected as shown below:

Col. 4, line 41, "hydrator" should read --dehydrator--.

Signed and Sealed this

Twelfth Day of February 1985

[SEAL]

Attest:

DONALD J. QUIGG

Attesting Officer

Acting Commissioner of Patents and Trademarks